US012544780B2

(12) United States Patent
Alluigi

(10) Patent No.: US 12,544,780 B2
(45) Date of Patent: Feb. 10, 2026

(54) TRIGGER DISPENSING DEVICE WITH MEANS TO AVOID THE LOSS OF PRODUCT

(71) Applicant: GUALA DISPENSING S.P.A., Alessandria (IT)

(72) Inventor: Riccardo Alluigi, Alessandria (IT)

(73) Assignee: Guala Dispensing S.P.A., Spinetta Marengo (IT)

( * ) Notice: Subject to any disclaimer, the term of this patent is extended or adjusted under 35 U.S.C. 154(b) by 280 days.

(21) Appl. No.: 18/546,136

(22) PCT Filed: Feb. 17, 2022

(86) PCT No.: PCT/IB2022/051422
§ 371 (c)(1),
(2) Date: Aug. 11, 2023

(87) PCT Pub. No.: WO2022/175866
PCT Pub. Date: Aug. 25, 2022

(65) Prior Publication Data

US 2024/0131546 A1 Apr. 25, 2024
US 2024/0226938 A9 Jul. 11, 2024

(30) Foreign Application Priority Data

Feb. 18, 2021 (IT) ........................ 102021000003743

(51) Int. Cl.
*B05B 11/10* (2023.01)

(52) U.S. Cl.
CPC ........ *B05B 11/104* (2023.01); *B05B 11/1057* (2023.01); *B05B 11/1069* (2023.01)

(58) Field of Classification Search
CPC ............. B05B 11/1011; B05B 11/1057; B05B 11/0044; B05B 11/0027; B05B 11/1069; B05B 11/104
USPC ........................................................ 222/383.1
See application file for complete search history.

(56) References Cited

U.S. PATENT DOCUMENTS 4,527,594 A * 7/1985 Garneau ............... B05B 11/007 137/854
2018/0369842 A1 12/2018 Kakuta

FOREIGN PATENT DOCUMENTS

JP 3995783 B2 10/2007

OTHER PUBLICATIONS

International Search Report for International Patent Application No. PCT/IB2022/051422, mailed May 23, 2022.

(Continued)

*Primary Examiner* — David P Angwin
*Assistant Examiner* — Christopher S. Parisi
(74) *Attorney, Agent, or Firm* — Armstrong Teasdale LLP

(57) ABSTRACT

A trigger dispensing head applicable to a bottle of a trigger dispensing device is provided. The trigger dispensing head has a cylinder chamber, a main vent passageway, a sleeve, a secondary vent passageway, an axially slidable piston, a suction duct, and a dispensing duct. The sleeve is rotatable by a user between an angular working position in which the main vent passageway is in fluid communication with the secondary vent passageway and an angular rest position, in which the main vent passageway is fluidically separated from the secondary vent passageway.

10 Claims, 14 Drawing Sheets

(56) References Cited

OTHER PUBLICATIONS

International Preliminary Report on Patentability for International Patent Application No. PCT/IB2022/051422, mailed Mar. 13, 2023.

* cited by examiner

TRIGGER DISPENSING DEVICE WITH MEANS TO AVOID THE LOSS OF PRODUCT

CROSS-REFERENCE TO RELATED APPLICATIONS

This application is a National Stage Application of International Patent Application No. PCT/IB2022/051422, having an International Filing Date of Feb. 17, 2022, which claims priority to Italian Application No. 102021000003743, filed Feb. 18, 2021, the entire contents of each of which are hereby incorporated by reference herein.

FIELD OF THE INVENTION

This invention is in the field of trigger dispensing devices, typically used for dispensing liquid products for household hygiene, personal care, and countless other purposes. In particular, the subject of this invention is a trigger dispensing head applicable to a bottle, provided with an anti-leakage device to prevent leakage of product from the venting duct.

BACKGROUND OF THE INVENTION

Trigger dispensing devices are enormously popular today; several hundred million units are manufactured and sold each year.

Traditionally, once the bottle has been filled with the product and the dispensing head has been applied to the bottle, the devices are placed in specially sized cardboard boxes so that they may safely travel to storage or sales locations. In particular, despite loading and unloading from the transport and storage means, the boxes ensure that the devices are not subject to shocks that could compromise their functionality or cause product spillage. Further, the placement of individual devices on supermarket shelves is also done by attentive staff and generally with great care.

For some years now, online commerce has been widely used by consumers for the purchase of food, detergents, and every other kind of merchandise. The widespread use of these sales methods has manifested new needs and raised new issues for the trigger dispensing device industry as well.

In fact, it is quite common for said devices to be stored in less than optimal conditions, or for a device to be shipped to the consumer in a standard-sized box that is larger than said device, or for other goods, such as a book or other bottles, to be placed in the same box.

During transport, the device is subjected to impacts and crushing, which may lead to the breakage of components such as the trigger or the shell, disassembly, undesired activation of the trigger and, often, to product leakage.

One of the drawbacks encountered is the leakage of product through the venting duct, which usually puts the internal compartment of the bottle in communication with the external environment, this being necessary to allow for air to enter into the bottle during the suction step while the product is sucked from the bottle towards the pressure chamber.

SUMMARY OF INVENTION

It is the object of this invention to make a trigger dispensing head which meets the aforesaid requirements and overcomes the drawbacks mentioned above.

This object is achieved by a dispensing head as described and claimed herein. Advantageous embodiments of the present invention are also described.

BRIEF DESCRIPTION OF THE DRAWINGS

The features and advantages of the dispensing head according to this invention will be apparent from the description below, given by way of non-limiting example in accordance with the figures in the appended drawings, wherein.

DETAILED DESCRIPTION

Figure 1:
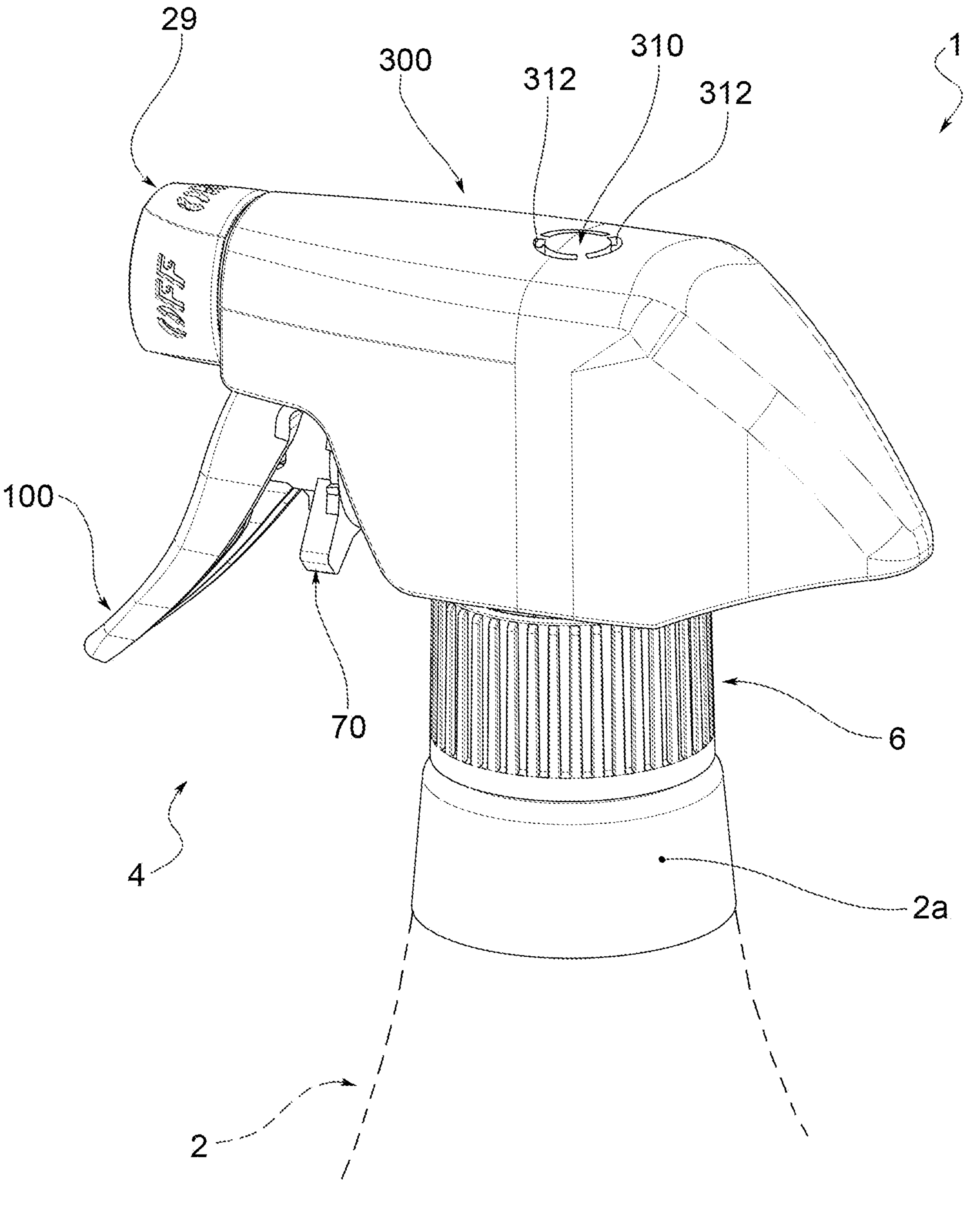
FIG. 1 depicts a trigger dispensing device according to an embodiment of this invention.
Figure 2:
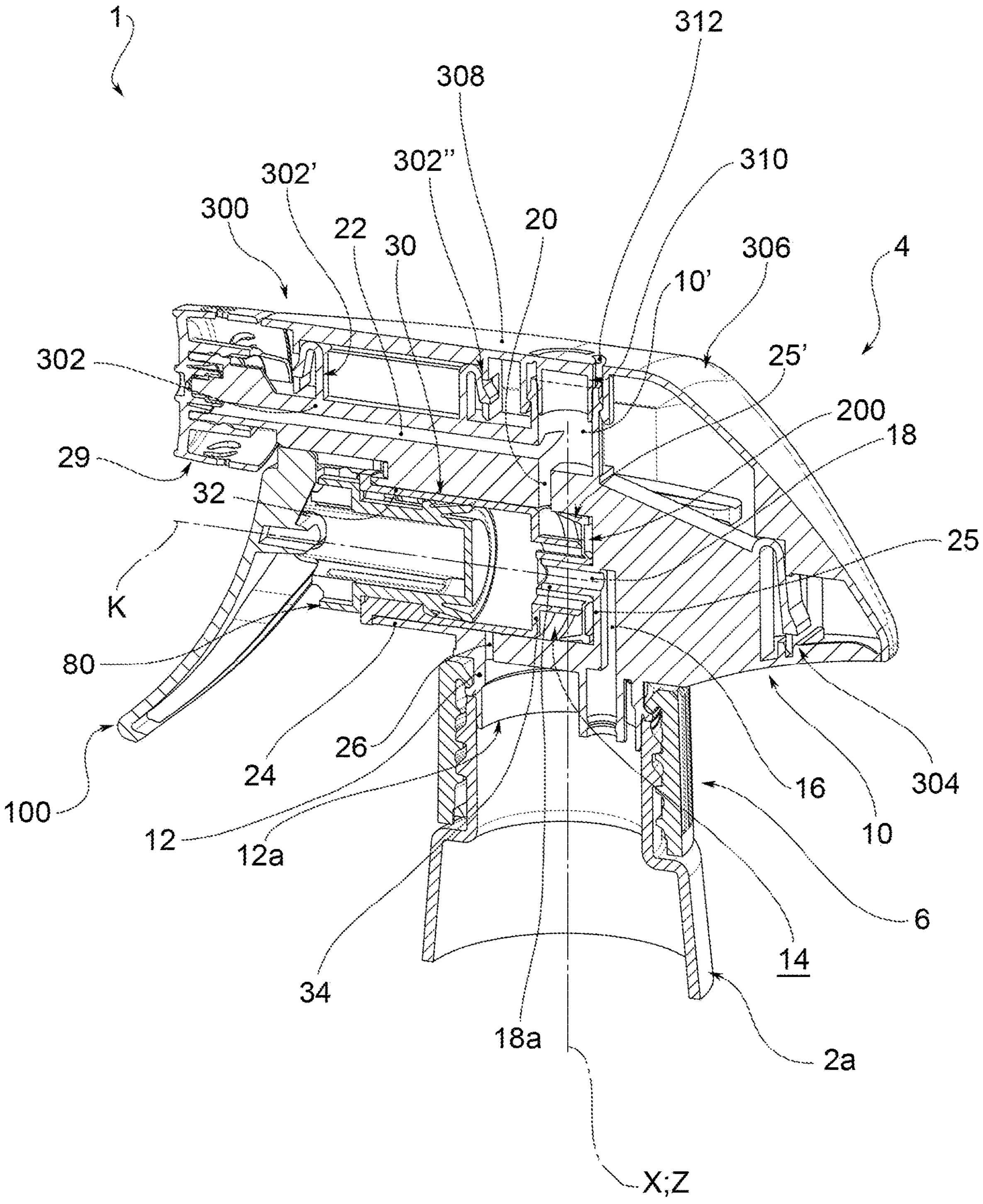
FIG. 2 shows a cross-sectional view of a trigger dispensing head according to an embodiment of this invention.

With reference to the figures of the appended drawings, a trigger dispensing device comprising a bottle 2 for containing a liquid product to be dispensed and a trigger dispensing head 4 applied to a neck 2_a_ of the bottle have been collectively referred to as 1. The neck 2_a_ has a neck axis X.

The head 4 is applicable to the bottle 2 by means of a ferrule system comprising a threaded ferrule 6 which may be screwed to the neck 2_a_ or, according to a variant embodiment, by means of a bayonet system (not shown), preferably equipped with an anti-removal ridge.

The head 4 comprises a frame 10, preferably made in one piece of plastic material, for example by injection molding, adapted to support the components of the head 4.

The frame 10 comprises an attachment portion 12 provided with a main opening 12_a_ having an attachment axis Z; when the head 4 is applied to the neck 2_a_, the main opening 12_a_ is in communication with the compartment inside the neck 2_a_, and the attachment axis Z is coincident with the neck axis X.

The head 4 further comprises a circular cylindrical-shaped cylinder chamber 14 having a chamber axis K orthogonal to the attachment axis Z; preferably, the cylinder chamber 14 is formed in the frame 10.

The head 4 further comprises a suction duct that connects the main opening 12*a* with the cylinder chamber 14.

Preferably, said suction duct comprises a first suction segment 16 which, starting from the main opening 12*a*, extends along a first suction axis W, parallel to and preferably spaced apart from the attachment axis Z, and a second suction segment 18 which flows into the cylinder chamber 14 and extends along a second suction axis Y, parallel to the chamber axis K; for example, the second suction axis Y is coincident with the chamber axis K. The second suction segment 18 is delimited by a suction mouth 18*a*.

Preferably, moreover, the first suction segment 16 and/or the second suction segment 18 are formed in the frame 10.

The head 4 further comprises a dispensing duct that places the cylinder chamber 14 in communication with the external environment.

Preferably, the dispensing duct comprises a first dispensing segment 20 which, starting from the cylinder chamber 14, extends along a first suction axis J orthogonal to the chamber axis K, and a second dispensing segment 22 which opens to the external environment and extends along a second dispensing axis Q parallel to the chamber axis K.

Preferably, moreover, the first dispensing segment 20 and/or the second dispensing segment 22 are formed in the frame 10.

The head 4 further comprises a nozzle 29, applied to the free end of the second dispensing segment 22, preferably rotatable at least between a dispensing position, wherein the second dispensing segment 22 is in communication with the external environment, and a closed position, wherein the fluid communication between the second dispensing segment 22 and the external environment is prevented.

The cylinder chamber 14 is annularly delimited by a cylinder wall 24, having an inner surface 24*b*, and on the bottom by a bottom wall 25, from which the suction mouth 18*a* of the suction duct, and in particular the second suction segment 18, protrudes. Further, a valve compartment 25' is defined between the sleeve 30, the cylinder wall 24, and the bottom wall 25, which will be discussed below.

A main vent passage 26, on the other hand, which connects the main opening 12*a* with the cylinder chamber 14, is formed in the cylinder wall 24. Further, at least one through-slot 28, preferably a pair of slots, having a circumferential pattern is obtained in the cylinder wall 24.

The head 4 further comprises a sleeve 30, inserted into the cylinder chamber 14 axially rotatable with the chamber axis K and preferably constrained with respect to an axial translation.

For example, the sleeve 30 comprises a cylindrical sleeve wall 32 that defines a head opening 33 of the sleeve 30, delimited by a sleeve edge 33*a*; the sleeve wall 32 further has an outer surface 32*a* and an inner surface 32*b*. The sleeve 30 further comprises a bottom wall 34 orthogonal to the chamber axis K and an annular end wall 36 defining a bottom opening 38 of the sleeve 30.

Preferably, the annular end wall 36 is radially lowered with respect of the sleeve wall 32. Preferably, the end wall 36 has a smaller diameter than the sleeve wall 32.

Preferably, the valve compartment 25' has an annular shape extending radially externally about the end wall 36.

On the outer surface 32*a*, the sleeve 30 has a first sealing region 40, delimited by first sealing ridges, e.g., first circumferential sealing ridges 42*a* and first axial sealing ridges 42*b*, and a second closed sealing region 44, delimited by second sealing ridges, e.g., second circumferential sealing ridges 42*c*.

Preferably, the first circumferential sealing ridges 42*a* and the second circumferential sealing ridges 42*c* form two continuous, axially spaced circumferential sealing beads, while the first axial sealing ridges 42 form two continuous, circumferentially spaced axial sealing beads arranged between said circumferential sealing beads.

According to a variant embodiment (not shown), the axial sealing ridges are arranged on the outer surface of the sleeve, while the circumferential sealing ridges are arranged on the inner surface of the cylinder wall.

The sleeve 30 also has a secondary vent passage 50 passing through the sleeve wall 32, which opens onto the outer surface 32*a* within the first sealing region 40.

The sleeve 30 further comprises at least one pin 51, preferably a pair of pins, projecting from the outer surface 32*a* and suitable to be accommodated in the respective slot 28 of the cylinder chamber 14.

Internally, the sleeve 30 has at least one pocket 60, preferably a pair of pockets, having a predetermined angular extension, open on the head opening 33 of the sleeve 30 so as to be axially accessible. For this purpose, said pocket 60 forms an enlargement 62 on the sleeve edge 33*a* of the head opening 33.

The sleeve 30 further comprises a maneuvering portion 70, for example comprising an element extending radially externally from the sleeve wall 32 proximal to the head opening 33.

The suction duct flows into the sleeve 30 through the bottom opening 38; in particular, the second suction segment 18 opens into the sleeve 30, for example, in the annular compartment delimited by the end wall 36.

The head 4 further comprises a piston 80, inserted into the sleeve 30 through the head opening 33 and sealed slidably within said sleeve 30.

Preferably, the piston 80 is made in one piece of plastic material, obtained for example by injection molding.

The preferably hollow piston 80 comprises an annular piston wall 82 extending along a piston axis P between a front end 84 and a rear end 86. The piston 80 further comprises a piston bottom 86 at the front end 84 and at least one circumferential piston seal 88 protruding externally from the piston wall 82. At the rear end 86, the piston 80 has a piston-coupling portion 90 for coupling to a trigger of the head 4, provided, for example, with holes 92.

The piston 80 further comprises at least one abutment 94, preferably a pair of abutments, projecting radially externally from the piston wall 82, preferably in the proximity of the rear end 86.

When the head 4 is assembled, the sleeve 30 is inserted into the cylinder chamber 14 so that the sleeve edge 33*a* remains outside the cylinder chamber 14 and abuts against the edge of the cylinder wall 24; the maneuvering portion 70 also remains outside.

The pin 51 of the sleeve 30 is accommodated slidably in the slot 28.

The sealing ridges 42*a*, 42*b*, 42*c* on the outer surface 32*a* of the sleeve 30 form a seal with the inner surface 24*b* of the cylinder wall 24.

The piston 80 is in turn inserted within the sleeve 30; within the sleeve 30, the piston seal 88 delimits a pressure chamber 30*a*, on the side where the suction duct opens.

The head 4 further comprises a trigger 100, comprising a lever actuation portion 102 suitable for positioning the user's fingers for actuating the head 4, and a trigger engagement portion 104 for connecting with the piston 80. For example, the trigger 100 is hinged to the piston 80, such as by engagement of the trigger engagement portion 104 with the piston engagement portion 90 of the piston 80.

The head 4 further comprises elastic return means suitable for permanently acting on the piston 80, either directly or indirectly, to bring it toward an initial position which will be discussed hereinafter. For example, said return means comprise at least one flexible element 110, preferably a pair of flexible elements, made in one piece with the actuation portion 102 of the trigger 100.

The head 4 further comprises valve means suitable for regulating the flow of product from the suction duct to the pressure chamber 30*a* and from the pressure chamber 30*a* to the dispensing duct. Said valve means are accommodated in the valve compartment 25'.

Said valve means comprise an at least partially flexible valve element 200 made in one piece, for example, by injection molding.

The valve element 200 comprises a tubular portion 202 comprising an annular valve wall 204 extending along a valve axis V, between a rear end 206 defining a rear opening 208, and a front end 210 defining a front opening 209.

The valve element 200 further comprises a flexible flap 212 connected in a cantilevered manner to the front end 210 of the valve wall 204, projecting radially internally.

The flap 212 has, from the side facing the rear opening 208, a shutter portion 214, for example flat or hemispherical or truncated-cone shape.

The valve element 200 further comprises an annular membrane 216 that extends radially externally from the tubular portion 202. The membrane 216 is, for example, flat or, according to further variants (not shown), concave on the part facing the front end 210 of the tubular portion 202 or convex on the part facing the front end 210 of the tubular portion 202.

The valve element 200 further comprises a support portion 218 composed of an annular support wall 220 that connects to and surrounds the membrane 216.

Preferably, the support wall 220 has a flared shape toward the front end 210 of the tubular portion 202 and, on the part facing the rear end 206, a wavy valve base 222 that forms a support for the valve element.

The valve element 200 is located in the cylinder chamber 14, against the bottom wall 25, against which the valve base 222 is placed; the support wall 220, on the other hand, is in contact with the cylinder wall 24 and creates a seal against product leakage.

The tubular portion 202 is threaded onto the suction duct, and in particular onto the second suction segment 18, and the flap 212 forms a flexible shutter for the suction duct. The suction mouth 18*a* of the suction duct and the flexible flap 212 form suitable suction valve means for allowing product to pass from the suction duct to the pressure chamber 30*a* in a suction step and preventing product from passing from the pressure chamber 30*a* to the suction duct in a dispensing step.

The membrane 216 cooperates with the sleeve 30, and in particular closes the bottom opening 38 of the pressure chamber 30*a* and abuts against the end wall 36. The end wall 36 and the membrane 216 form pre-compression valve means suitable to allow product to pass from the pressure chamber 30*a* to the dispensing duct only when the pressure in the pressure chamber 30*a* exceeds a predetermined threshold value. Said pre-compression valves are also suitable for preventing the product from passing from the dispensing duct to the pressure chamber 30*a* during a suction step.

The valve element 200, cooperating with the suction mouth 18*a* of the suction duct and the end wall 36 of the sleeve, thus integrates both the suction valve means and the pre-compression valve means into a single component.

In normal operation of the trigger dispensing device, the head 4 is applied to the bottle 2, so that the suction duct is in communication with the compartment inside the bottle, via the main opening 12*a*.

Figure 3:
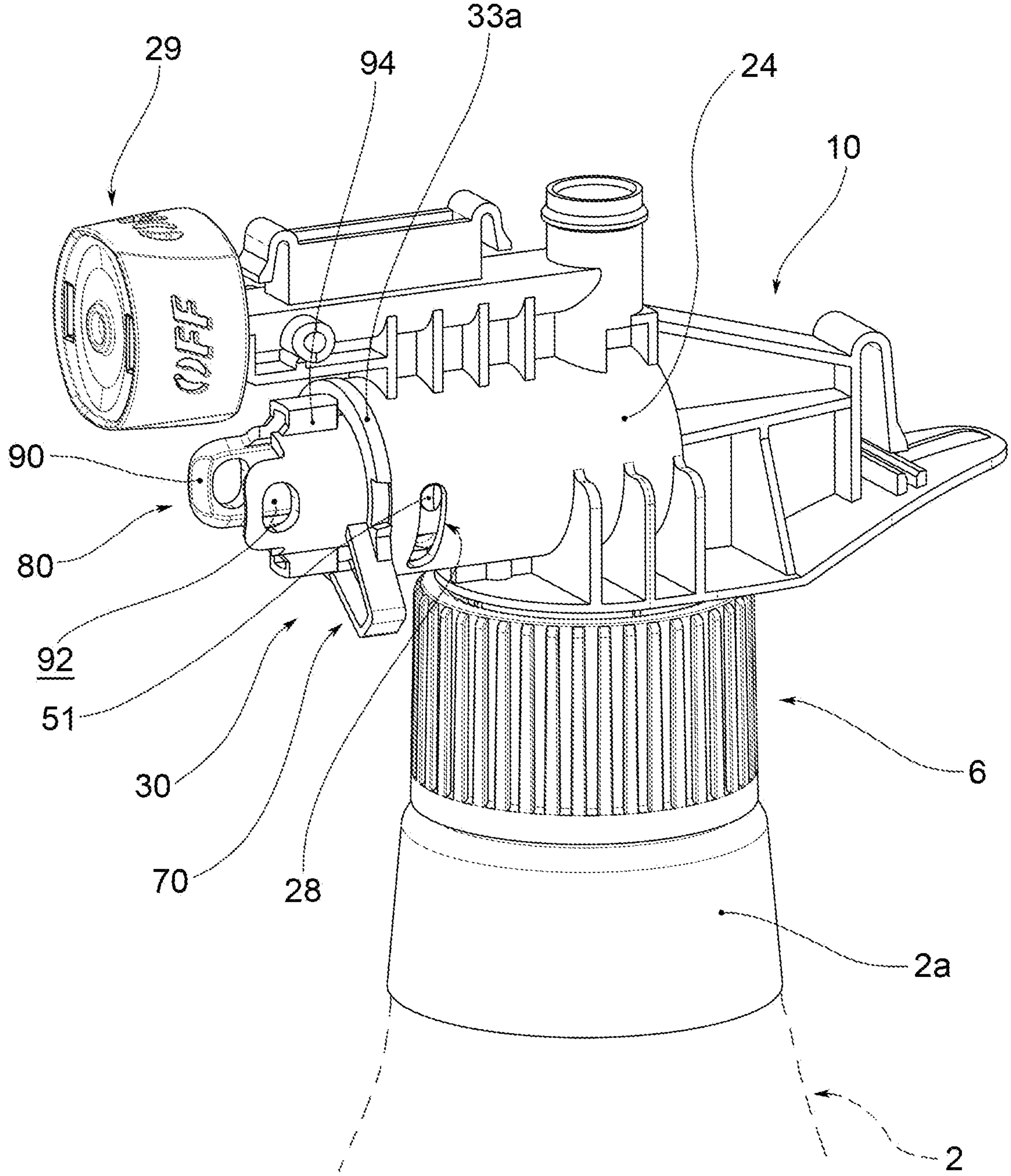
FIG. 3 illustrates an initial locking configuration of the dispensing head.

Preferably, in an initial locking configuration (FIG. 3), the sleeve 30 is in an angular locking position whereby the sleeve edge 33*a* forms an obstacle to the axial translation of the abutment 94 of the piston 80, whereby, while actuating the trigger 100, the piston 80 is prevented from completing a stroke that actuates dispensing. In said initial locking configuration, the maneuvering portion 70 and the pin 51 of the sleeve 30 are in their respective angular locking positions.

Figure 4:
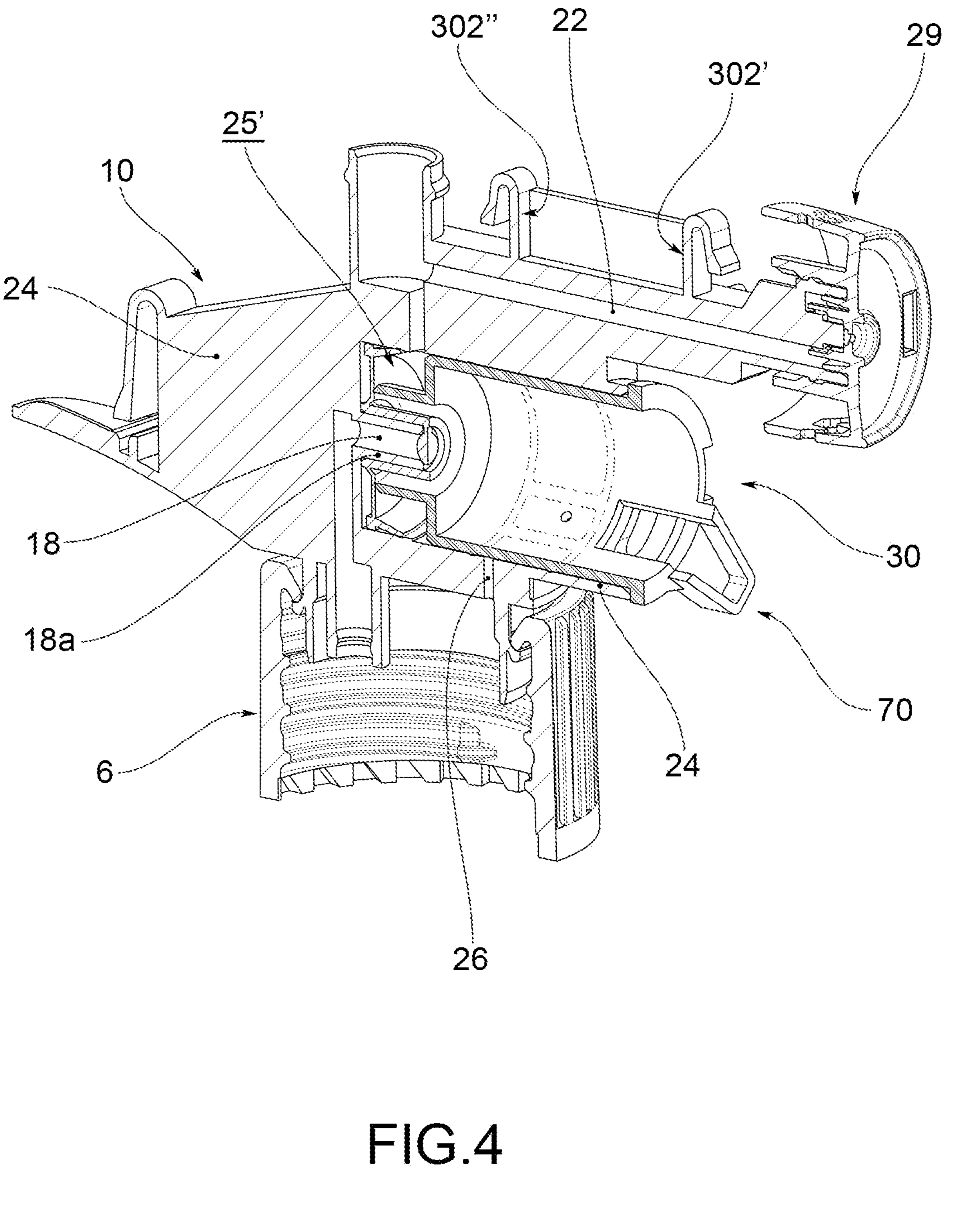
FIG. 4 is a cross-sectional view of FIG. 3.

In said configuration, the main vent passage 26 is sealed from the external environment, thus preventing the product from escaping to the outside in the event of the device tipping over. In effect, when the sleeve is in the angular locking position, the main vent passage 26 opens into the second sealing region 44 of the outer surface 32*a* of the sleeve 30, which, cooperating with the inner side surface 24*b* of the cylinder wall 24, forms a sealed closed space (FIG. 4).

Figure 5:
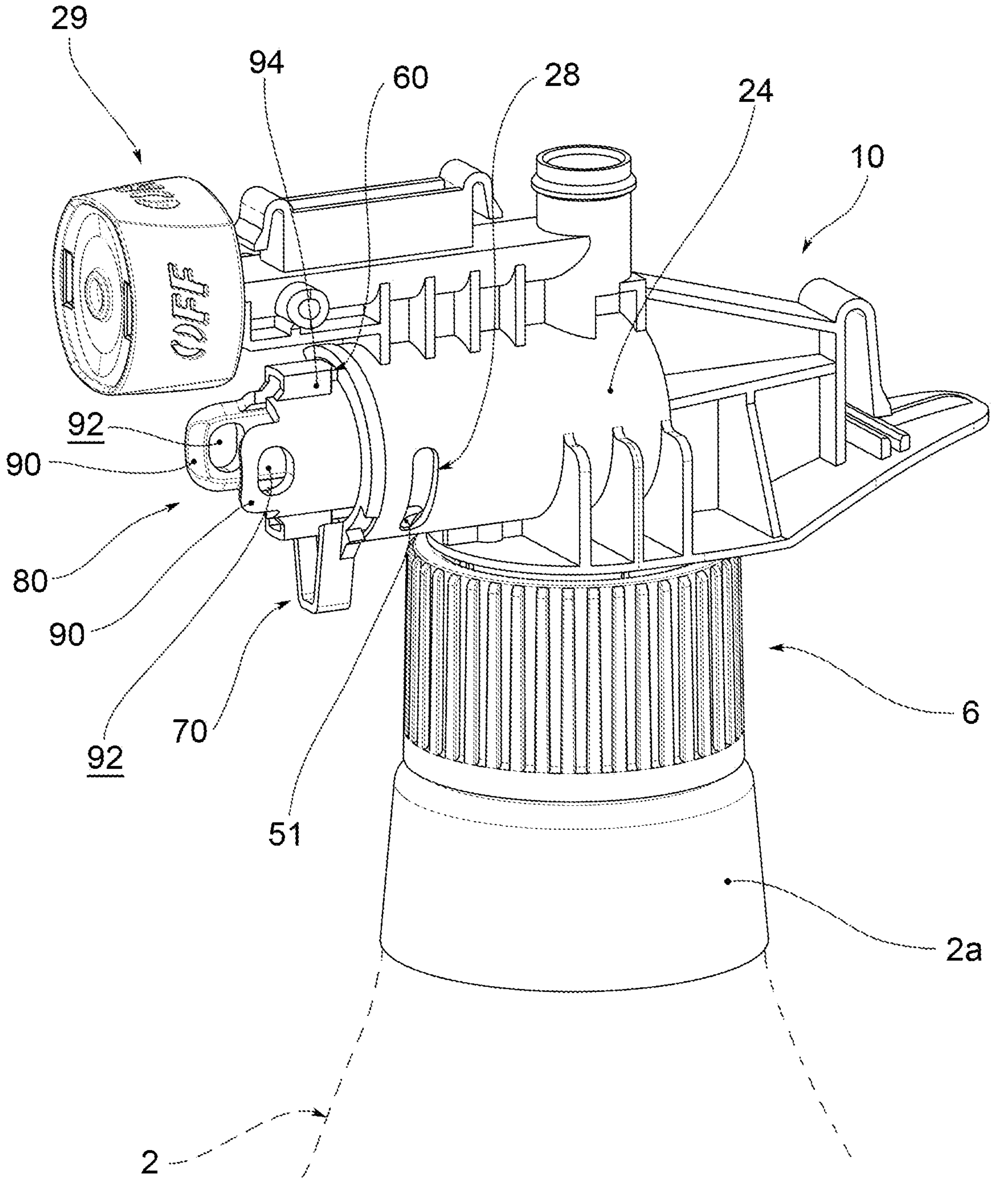
FIG. 5 illustrates an initial released configuration of the dispensing head.

Preferably, by rotating the sleeve 30, for example via the maneuvering portion 70, by, for example, an angle of about 45°, the head 4 reaches an initial release configuration (FIG. 5), wherein the pocket 60 of the sleeve 30 is axially aligned with the abutment 94 of the piston 80, so that, upon actuating the trigger 100, the piston 80 may make an actuation stroke of the head that allows product to be dispensed. In said initial release configuration, the maneuvering portion 70 and the pin 51 of the sleeve 30 are in the respective angular release position.

Figure 6:
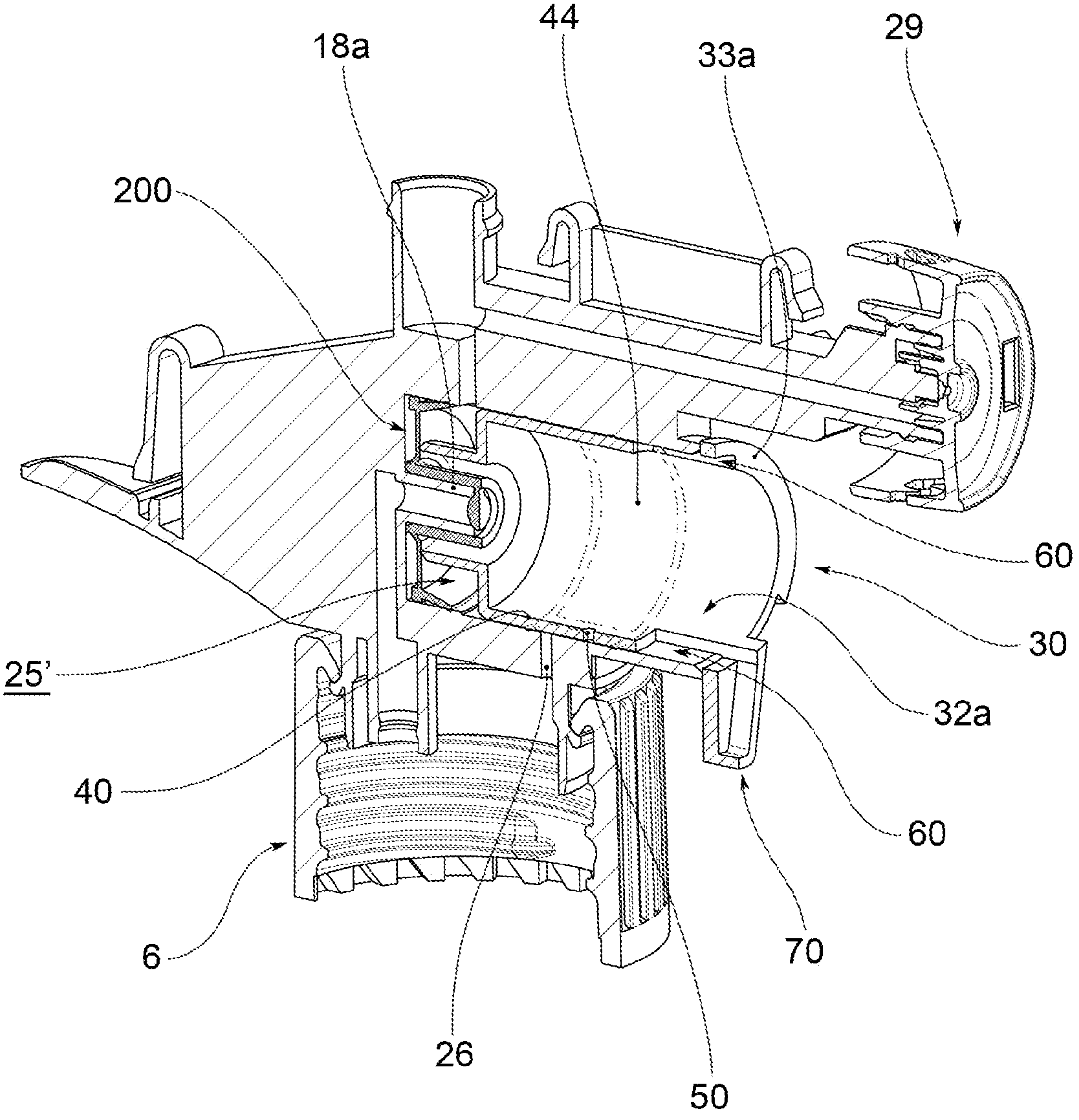
FIG. 6 is a cross-sectional view of FIG. 5.

Further, in said configuration, the main vent passage 26 is open to the external environment, thus allowing air to be drawn in from the outside into the internal compartment of the bottle during the suction step. In fact, when the sleeve 30 is in the angular release position, the main vent passage 26 flows into the first sealing region 40 of the outer surface 32*a* of the sleeve 30, which, cooperating with the inner side surface 24*b* of the cylinder wall 24, forms a delimited space which, via the secondary vent passage 50, communicates with the inner surface 32*b* of the sleeve 30, which is in communication with the external environment during the suction step (FIG. 6).

In other words, the sleeve 30 is rotatable by the user between an angular working position, wherein the main vent passage 26 is in fluid communication with the secondary vent passage 50, and an angular rest position, wherein the main vent passage 26 is fluidically separated from the secondary vent passage 50. In particular, in the angular rest position, the main vent passage 26 is fluidically separated from the secondary vent passage 50 by said sealing ridges 42*a*, 42*b*, 42*c*, arranged between the inner surface 24*b* of the cylinder wall 24 and the outer surface 32*a* of the sleeve wall 32.

In the initial release configuration, the trigger 100 and the piston 80 are in a respective initial rest position, and the pre-compression valve means and the suction valve means are in a respective closed configuration.

By actuating the trigger 100, the axial translation of the piston 80 occurs, said piston moving within the sleeve 30 and putting pressure on the product contained in the pressure chamber 30*a*.

Figure 7:
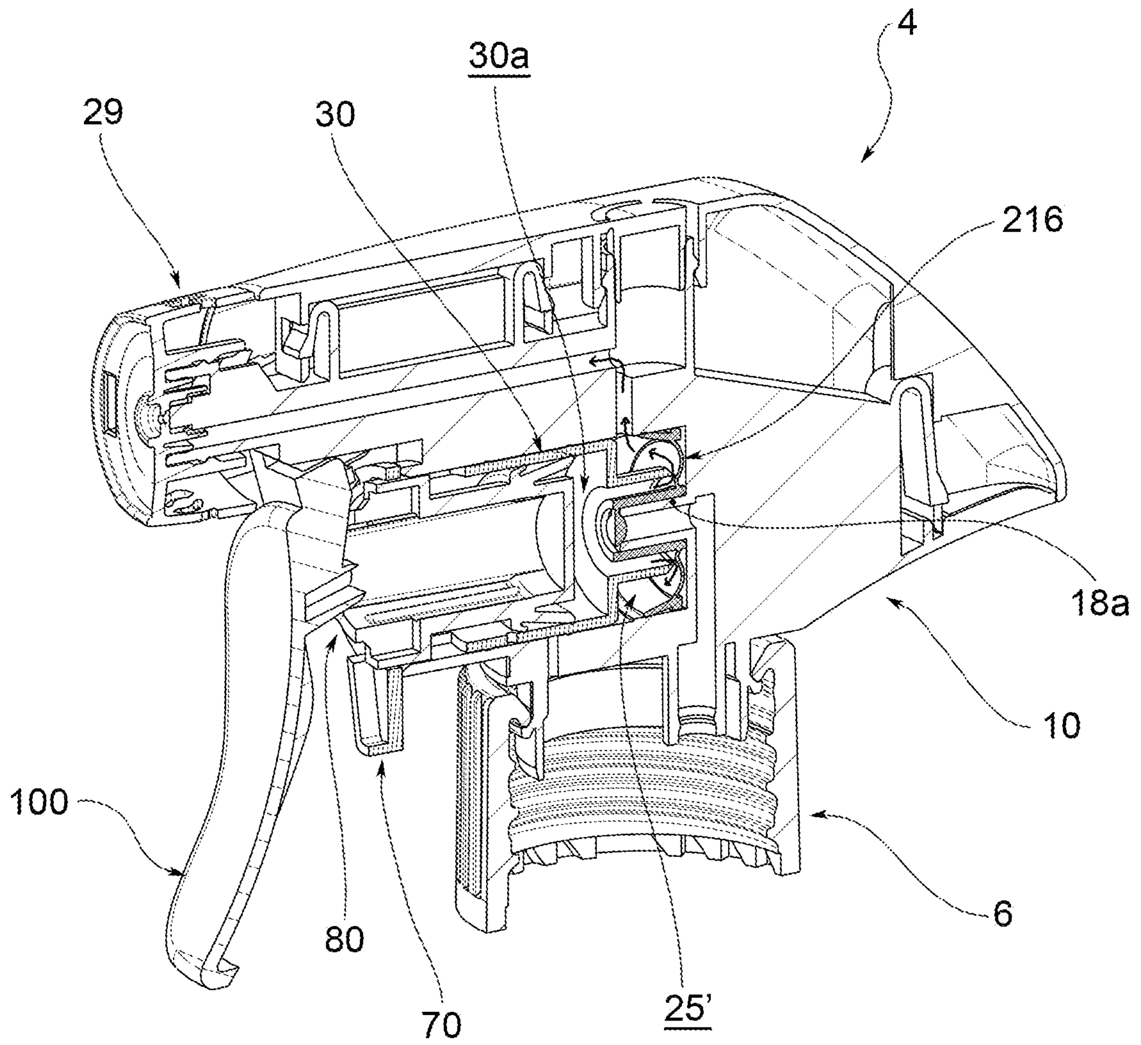
FIG. 7 depicts the dispensing head with pre-compression valve means in an open configuration.

Once a predefined threshold pressure in the pressure chamber 30*a* has been exceeded, the pre-compression valve means pass to an open configuration wherein they allow the product to pass from the pressure chamber 30*a* to the dispensing duct (FIG. 7).

Specifically, the membrane 216 separates from the end wall 36 of the sleeve 30 and allows the product to pass to the dispensing duct, allowing it to be dispensed externally through the nozzle 29 (dispensing step). The suction valve means remain in the closed configuration.

Figure 8:
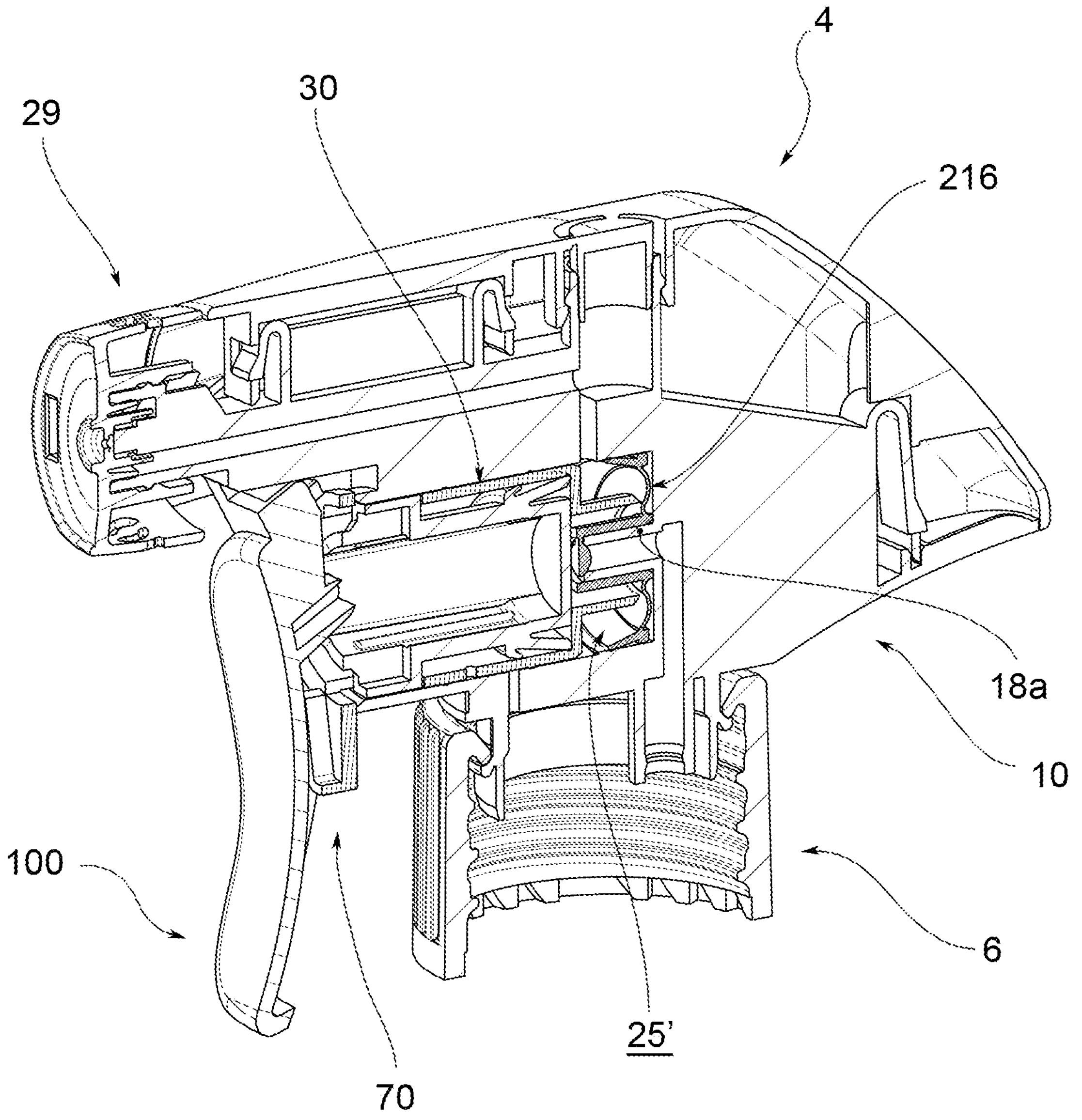
FIG. 8 depicts the dispensing head with the piston in a stroke-end position.

Once the trigger 100 and piston 80 are in the stroke-end position (FIG. 8) and the dispensing step is complete, the trigger 100 is released and the elastic return devices operate to return the piston 80 and the trigger 100 to their initial rest position.

Figure 9:
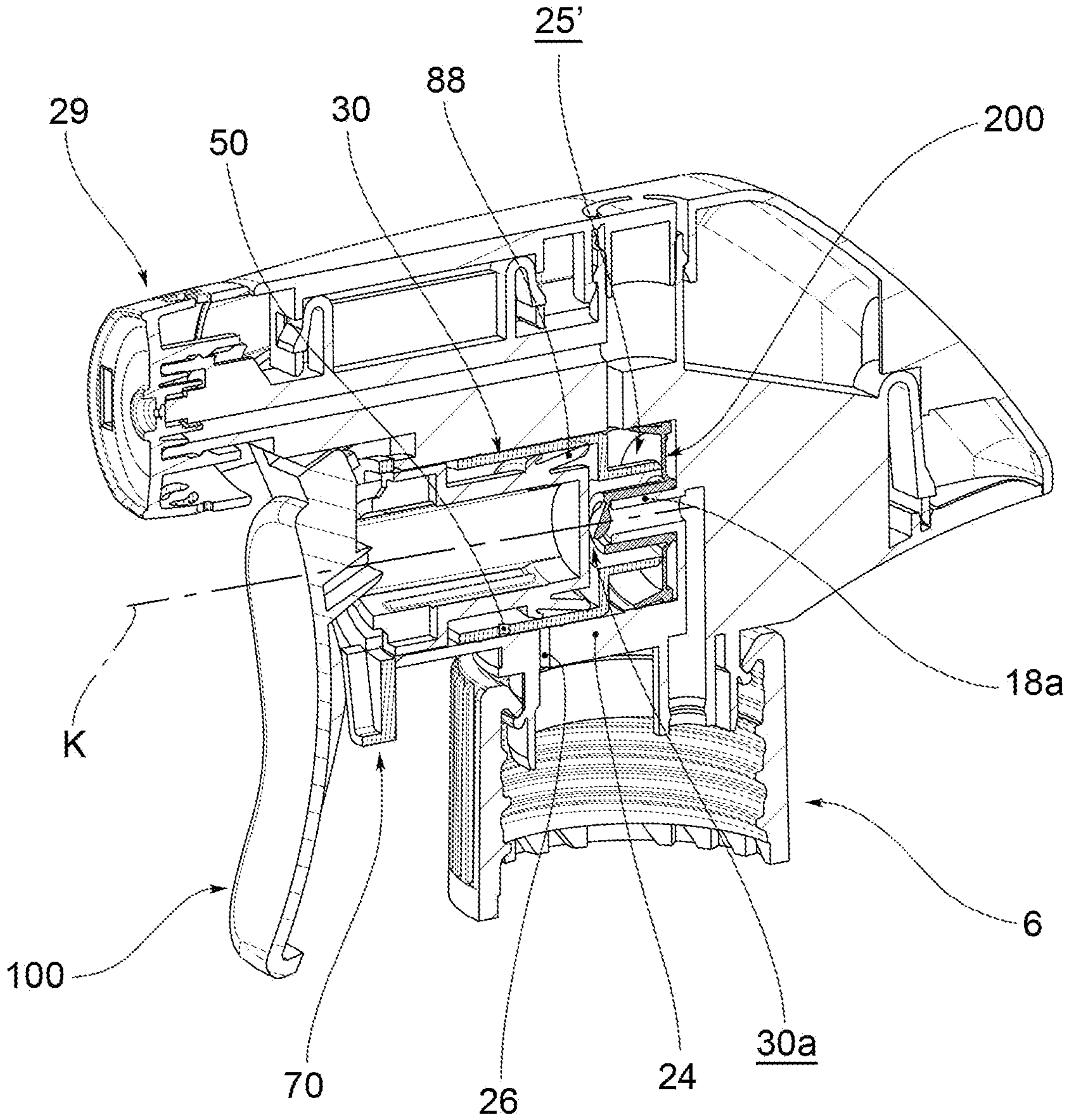
FIG. 9 depicts the dispensing head with suction valve means in an open configuration.
Figure 10:
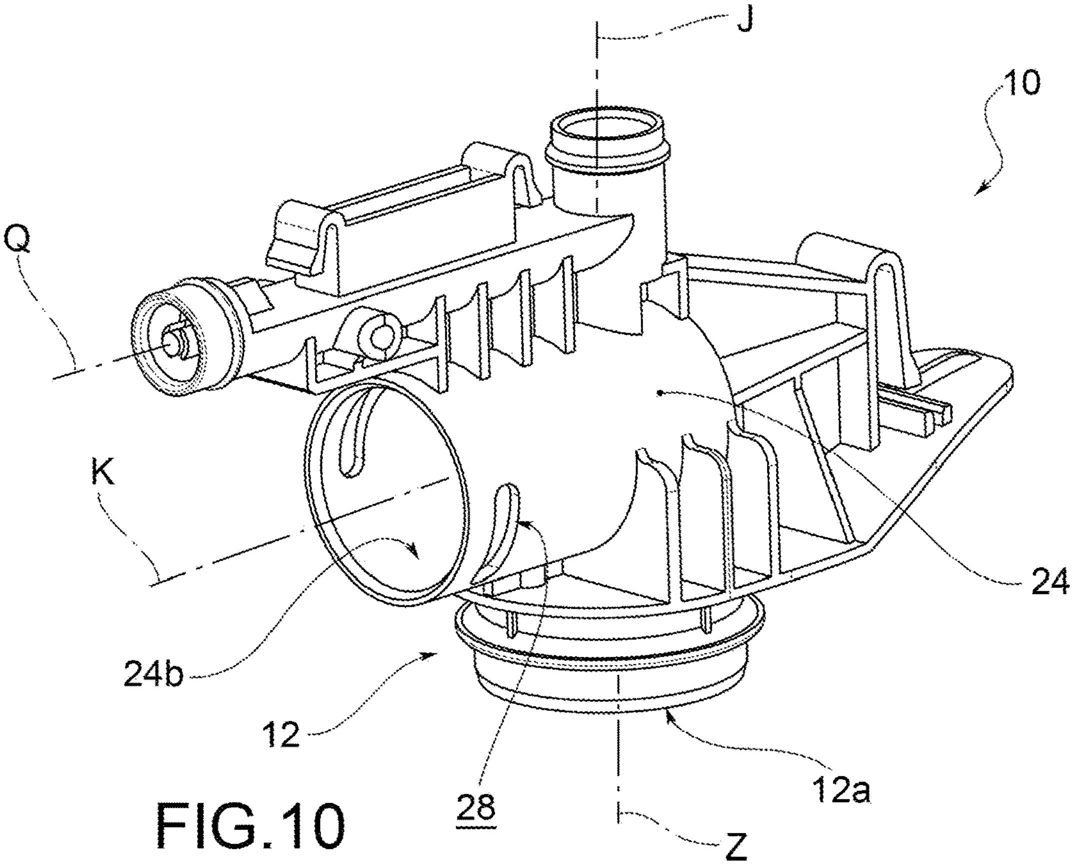
FIG. 10 depicts a frame of the dispensing head.
Figure 11:
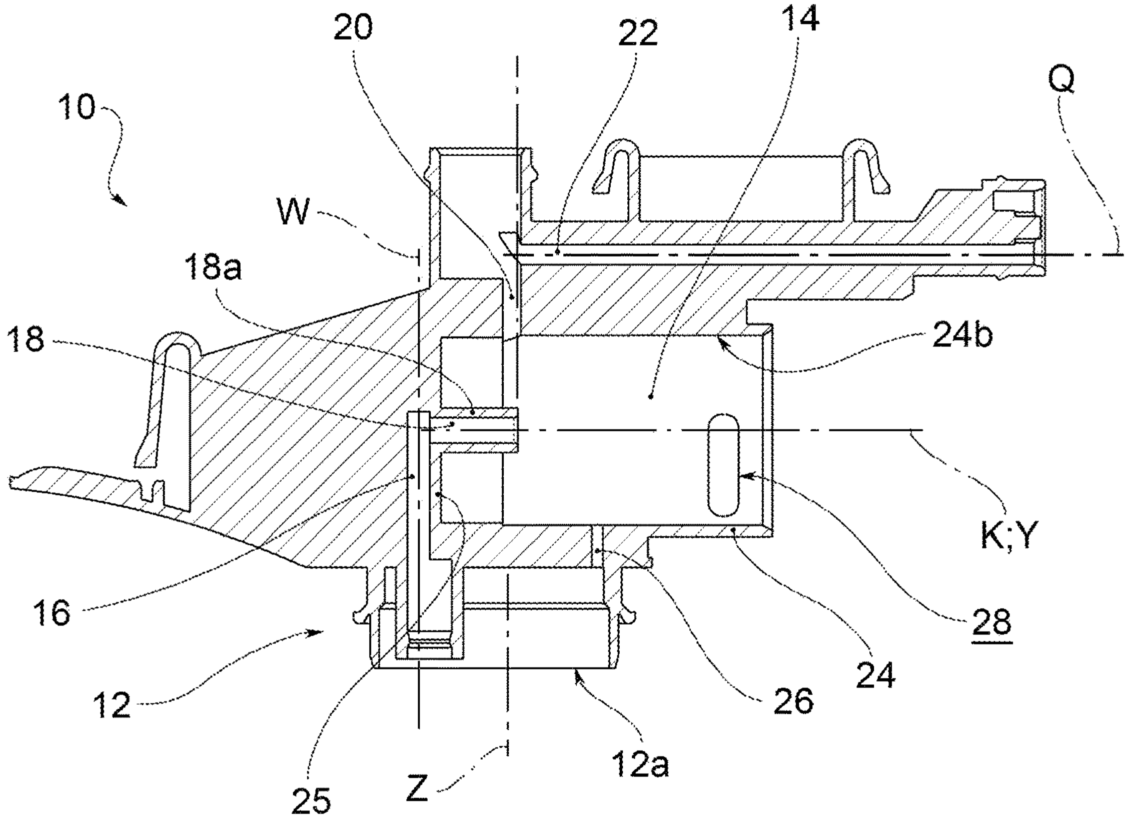
FIG. 11 is a cross-sectional view of the frame in FIG. 10.
Figure 12:
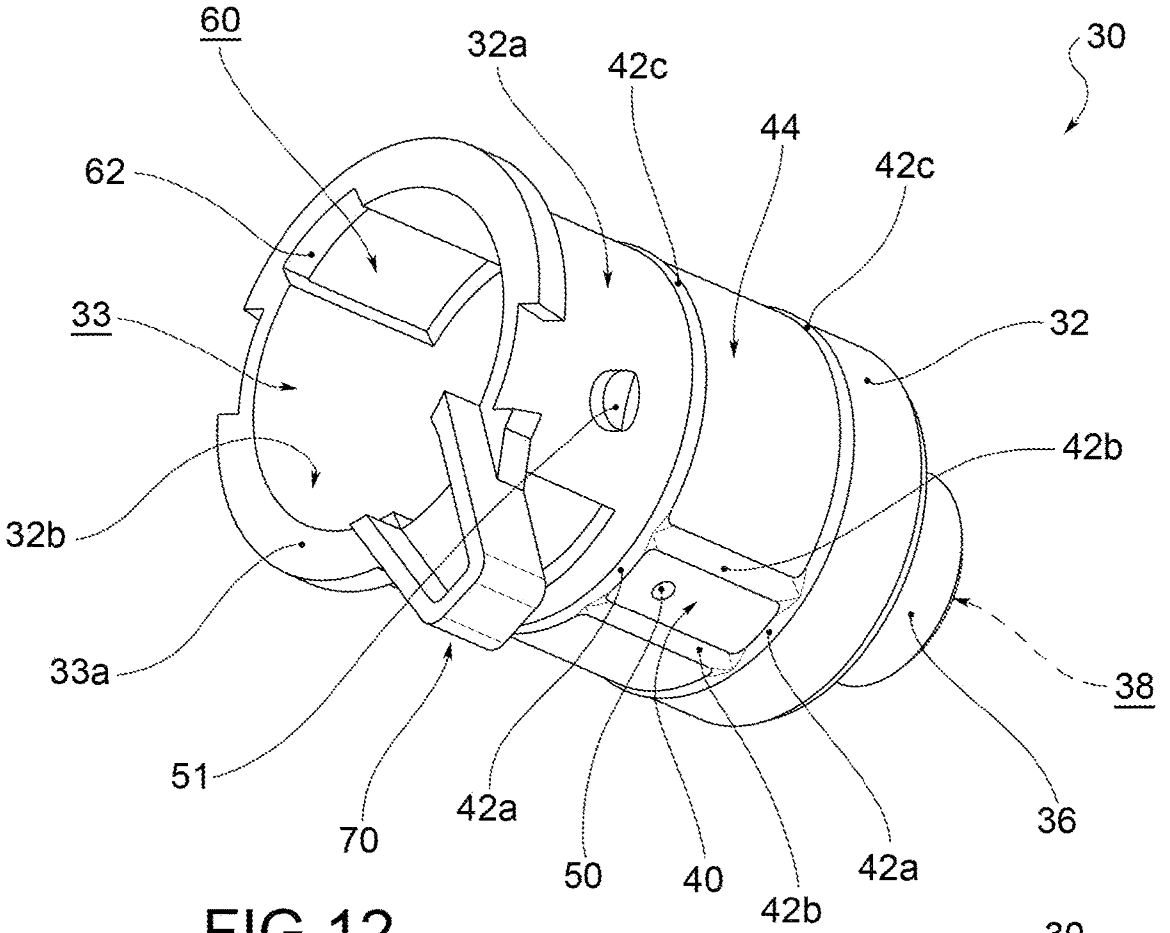
FIG. 12 shows a sleeve of the dispensing head.
Figure 13:
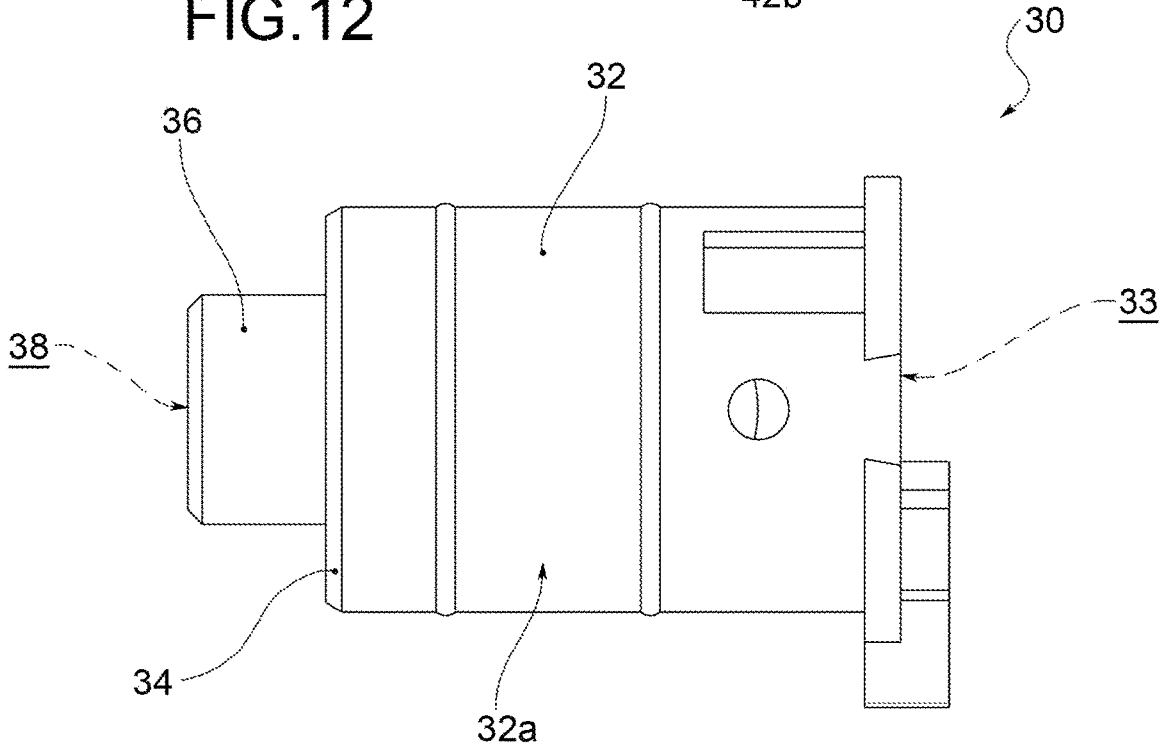
FIG. 13 is a cross-sectional view of the sleeve in FIG. 12.
Figure 14:
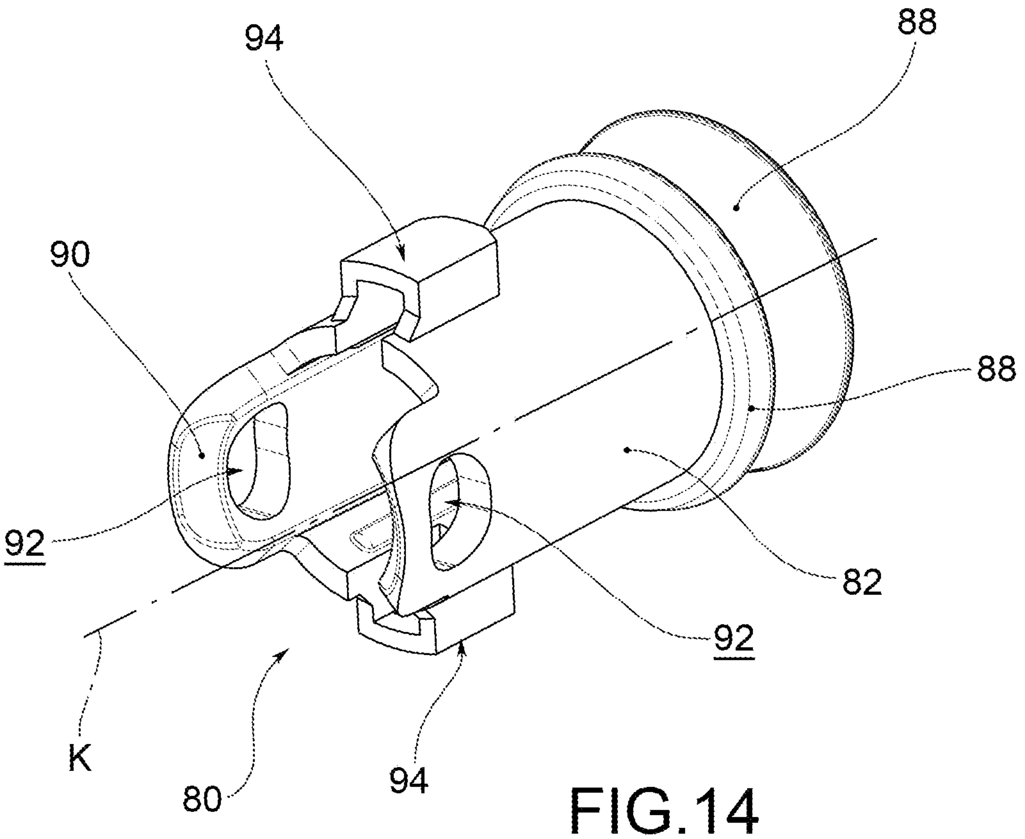
FIG. 14 illustrates a piston of the dispensing head.
Figure 15:
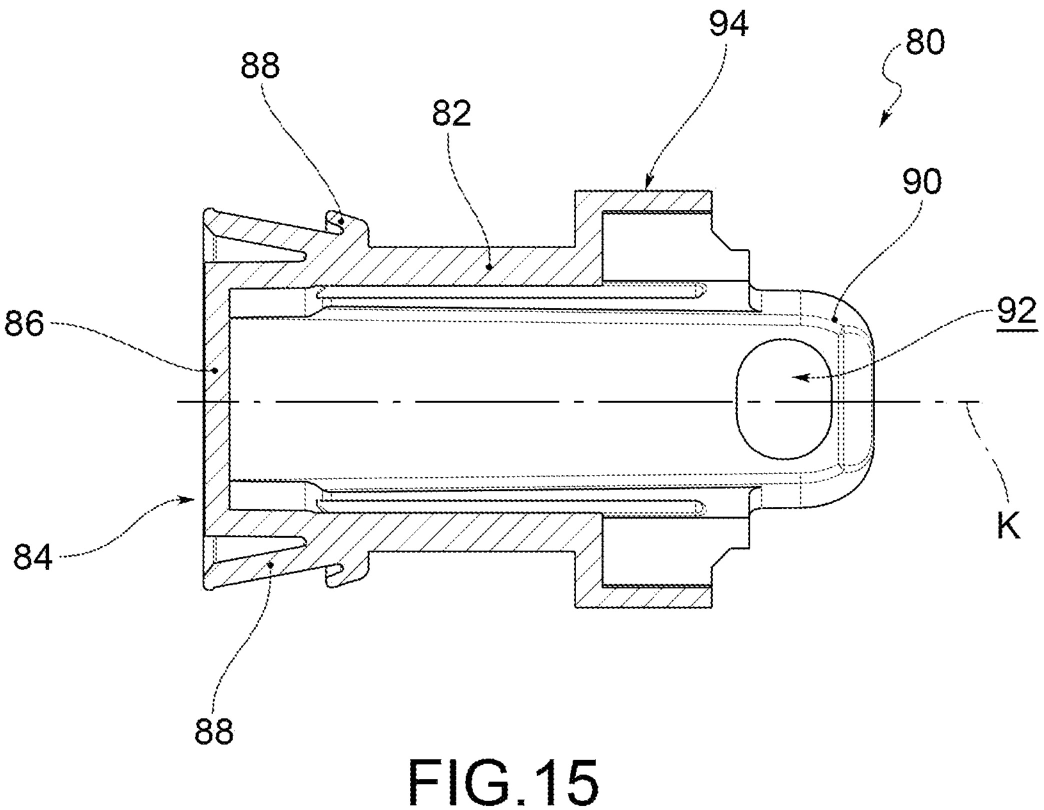
FIG. 15 is a cross-sectional view of the piston in FIG. 14.
Figure 16:
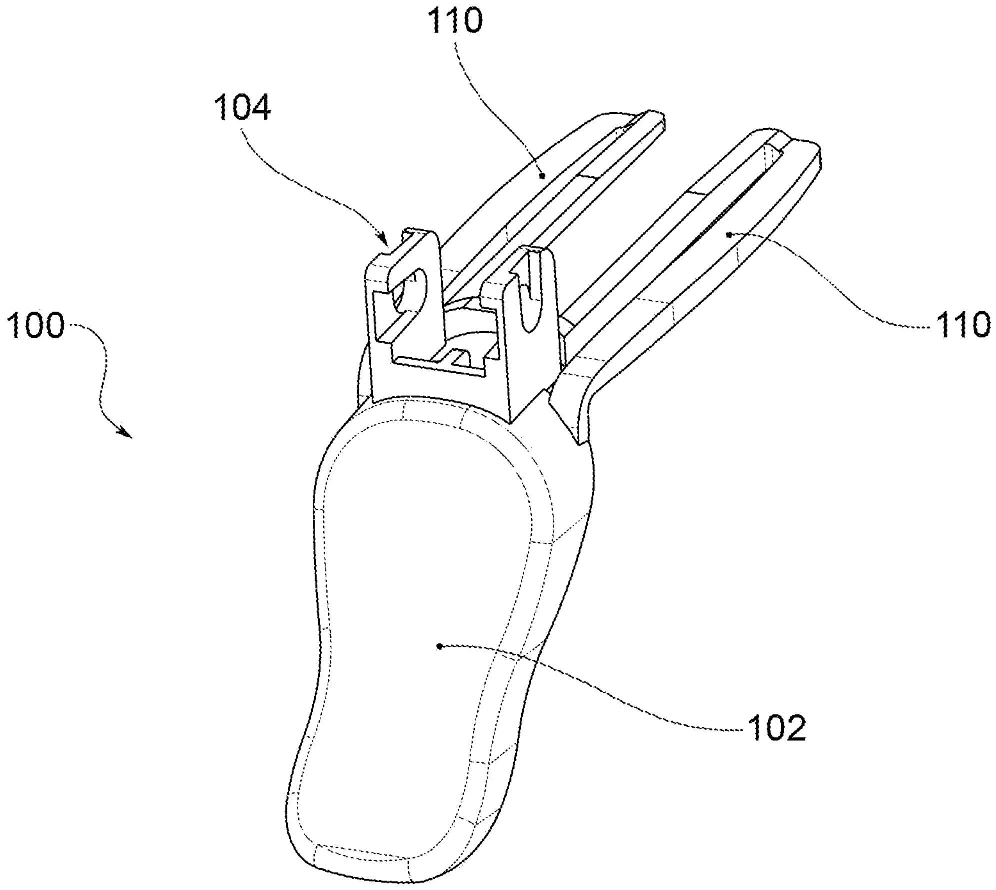
FIG. 16 depicts a trigger of the dispensing head.
Figure 17:
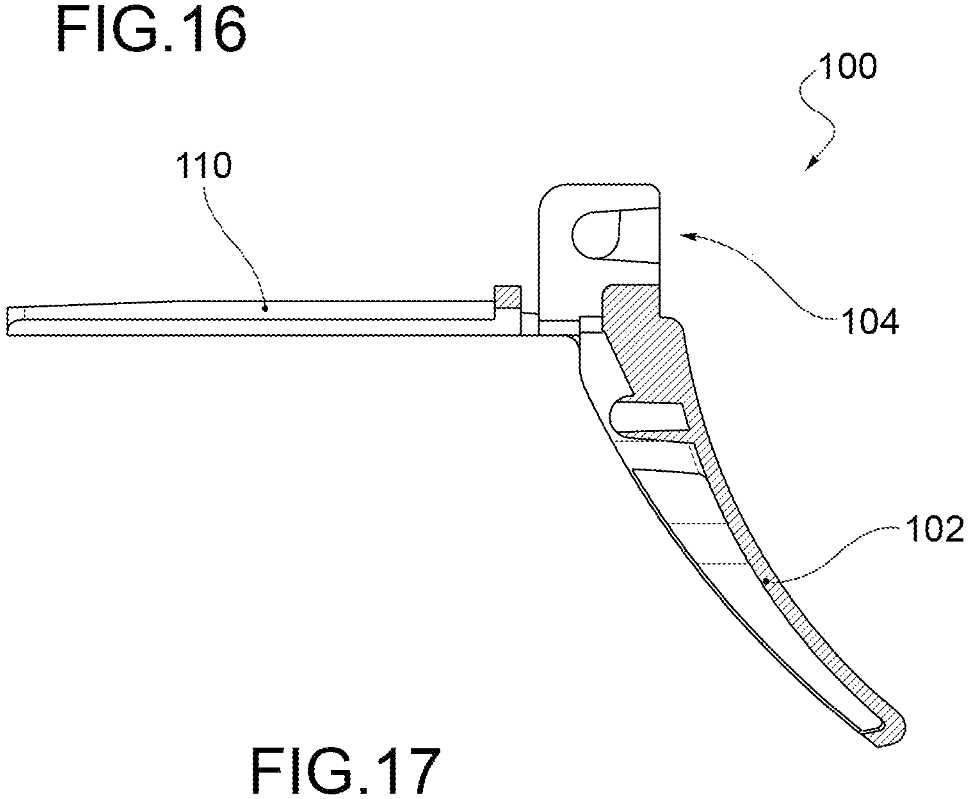
FIG. 17 is a cross-sectional view of the trigger in FIG. 16.
Figure 18:
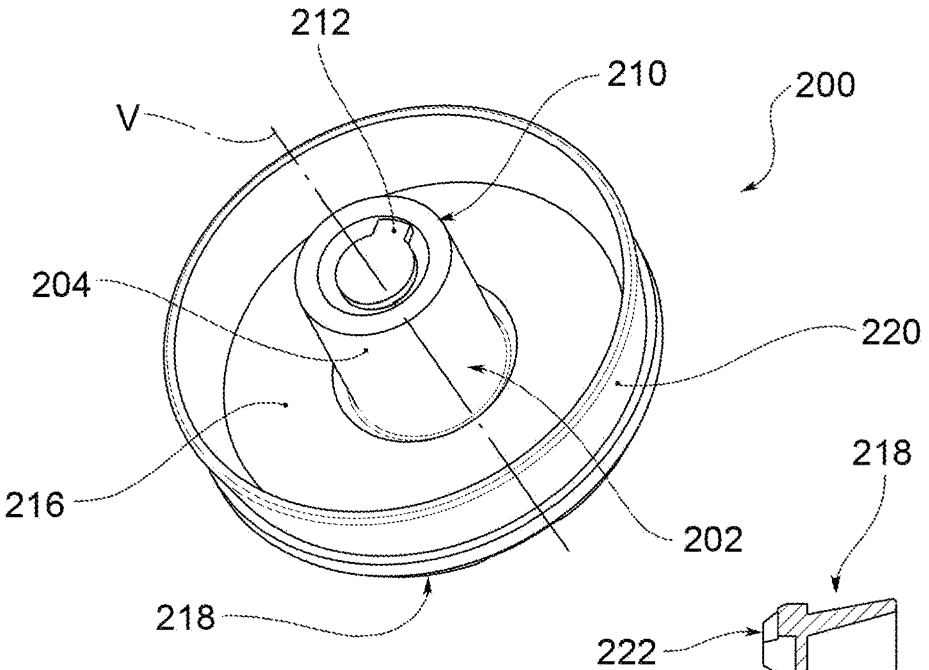
FIG. 18 depicts a valve element of the dispensing head.
Figure 19:
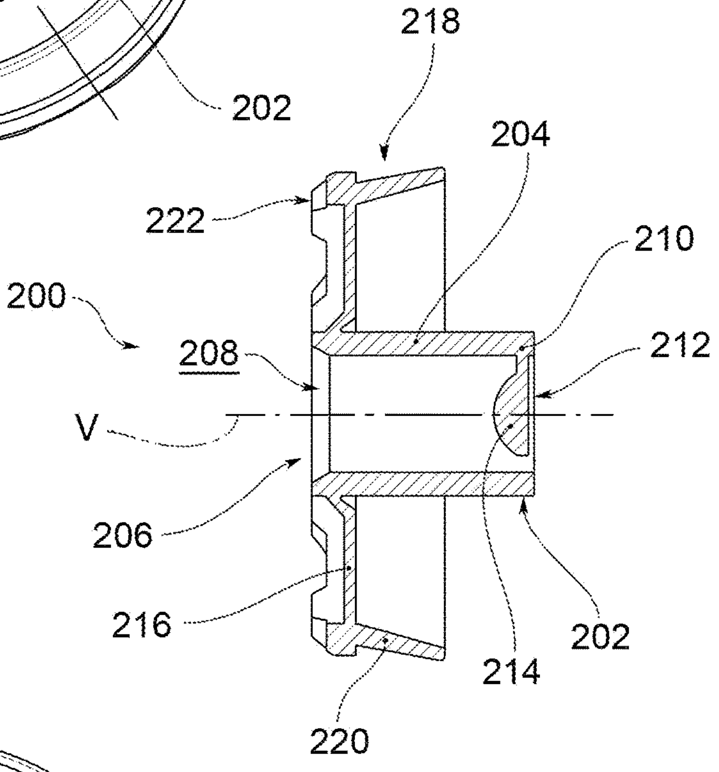
FIG. 19 is a cross-sectional view of the valve element in FIG. 18.
Figure 20:
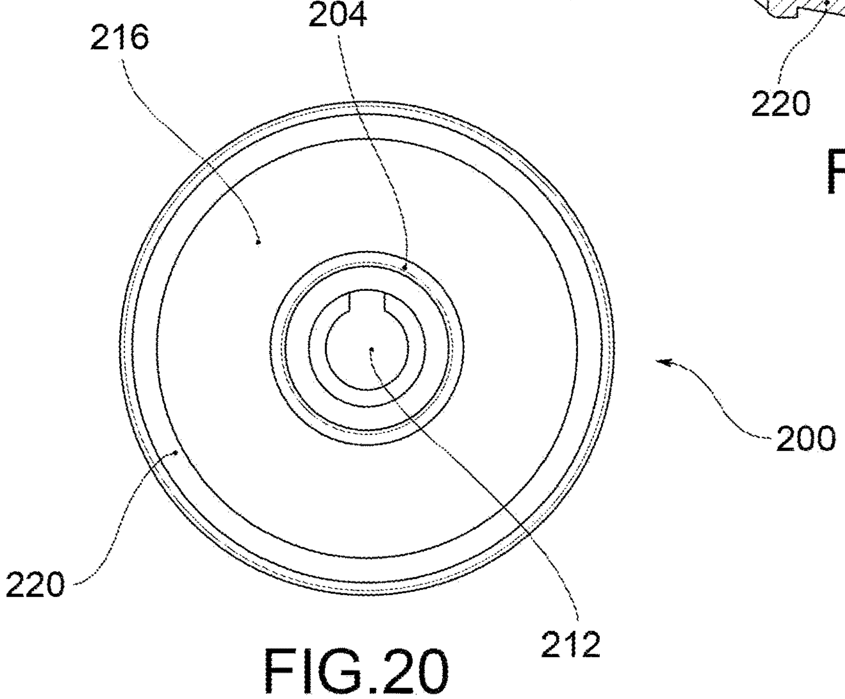
FIG. 20 is a plan view of the valve element in FIG. 18.

The return of the piston 80 to its initial rest position causes a pressure drop in the pressure chamber 30*a*, which causes the suction valve means to move into an open configuration wherein they allow product to be drawn from the suction duct into the pressure chamber 30*a* (FIG. 9).

In particular, the flap 212 flexes and separates from the suction mouth 18*a* of the suction duct, allowing the product to pass from the suction duct into the pressure chamber 30*a* (suction step).

Further, in the suction step, the internal compartment of the bottle is in communication with the external environment through the secondary vent passage 50, the first sealing region 40, and the main vent passage 26.

According to a preferred embodiment, moreover, the head 4 comprises a shell 300 attached to the frame 10 to cover it. Preferably, the shell 300 is applied to the frame 10 by at least one snap coupling.

For example, there is provided a first snap coupling 302 arranged in an upper region of the frame 10, such as above the second dispensing segment 22, and a second snap coupling 304, arranged in a lower region of the frame, for example below the bottom wall 25 of the cylinder chamber 14.

For example, the at least one snap coupling comprises a pair of flexible hooks 302', 302" that work in an opposing manner.

Preferably, moreover, an upper surface 306 of the shell 300 comprises a flat region 308. Advantageously, said region allows any weight on the device to be better supported, for example during storage in the warehouse, avoiding the detachment of the shell from the frame.

According to an embodiment, moreover, wherein the first dispensing segment 20 is formed in the frame 10 and extends along the first suction axis J orthogonal to the chamber axis K, the frame 10 also has an extension 10' of the first dispensing segment 20 along said first suction axis J.

The extension 10' is itself open to the outside in order to allow, during the molding of the frame, the introduction of a core for forming the first dispensing segment 20.

Preferably, the shell 300 comprises a cap 310, protruding internally, suitable for closing off access to the outside of the extension 10'.

Preferably, moreover, the cap 310 is connected to the remaining portion of the shell 300 via a plurality of breakable septa 312. In the event of strong impacts, such as to cause even temporary deformation of the shell 300 or even disassembly, at least some of said septa 312 will encounter breakage, so that the cap 310 is at least partially released from the remaining portion of the shell 300 and remains to close the extension 10'. Advantageously, this prevents product from leaking from the extension 10'.

According to a variant embodiment (not shown), the shell is devoid of the cap, and the head comprises a separate cap, applied to the extension to close it.

According to another aspect of the invention, the dispensing head comprises:

- a cylinder chamber 14;
- a sleeve 30, at least partially received in the cylinder chamber 14, having internally at least one pocket 60 having a predetermined angular extension, axially accessible from the outside;
- an axially slidable piston 80 sealed inside the sleeve 30 between an initial rest position and a final stroke-end position, comprising an annular piston seal 88 forming a pressure chamber 30*a* and at least one abutment 94;
- a suction duct suitable to put the internal compartment of the bottle in communication with the pressure chamber 30*a* and a dispensing duct suitable to put the pressure chamber 30*a* in communication with the external environment;
- wherein said sleeve 30 is rotatable by the user between an angular locking position wherein the abutment 94 prevents the piston from translating axially toward the stroke-end position, and an angular unlocking position wherein the abutment 94 is insertable into the pocket 60 to allow the piston 80 to translate to the stroke-end position.

According to yet another aspect of the invention, the dispensing head comprises:

- a cylinder chamber 14 delimited annularly by a cylinder wall 24 and at the bottom by a bottom wall 25;
- a sleeve 30, at least partially insertable into the cylinder chamber 14;
- an axially slidable piston 80 sealed inside the sleeve 30 between an initial rest position and a final stroke-end position, comprising an annular piston seal 88 forming a pressure chamber 30*a;*
- a suction duct suitable to put the inner compartment of the bottle in communication with the pressure chamber 30*a* and a dispensing duct suitable to put the pressure chamber 30*a* in communication with the external environment;
- valve means suitable for regulating the flow of product from the suction duct to the pressure chamber 30*a* and from the pressure chamber 30*a* to the dispensing duct.

Innovatively, the dispensing head described above meets the needs of the industry and overcomes the drawbacks discussed above because, when the head is in its initial locking configuration, it prevents product from escaping through the venting duct. At the same time, it also prevents the trigger from actuating the piston.

Advantageously, moreover, the piston slides inside the sleeve, which is substantially free of shrinkage after molding; the sliding therefore takes place on a surface having a high cylindricity, which ensures a better seal.

It is understood that a person skilled in the art, in order to meet contingent needs, could make modifications to the dispensing head described above, all of which are contained within the scope of protection as defined by the following claims.

The invention claimed is:

1. A trigger dispensing head applicable to a bottle of a trigger dispensing device, comprising:

- a cylinder chamber annularly delimited by a cylinder wall having an inner surface;

a main vent passageway passing through the cylinder wall and adapted to put an inner compartment of the bottle in communication with the inner surface of the cylinder wall;

a sleeve at least partially received in the cylinder chamber, comprising an annular sleeve wall having an outer surface and an inner surface in communication with an external environment, and a secondary vent passageway passing through the annular sleeve wall;

an axially slidable piston sealed inside the sleeve between an initial rest position and a final stroke-end position, comprising an annular piston seal that forms a pressure chamber; and a suction duct adapted to put the inner compartment of the bottle in communication with the pressure chamber and a dispensing duct adapted to put the pressure chamber in communication with an external environment;

wherein said sleeve is rotatable by a user between an angular working position, in which the main vent passageway is in fluid communication with the secondary vent passageway, and an angular rest position, in which the main vent passageway is fluidically separated from the secondary vent passageway.

2. The trigger dispensing head of claim 1, further comprising sealing ridges arranged between the inner surface of the cylinder wall and the outer surface of the annular sleeve wall, wherein, in the angular rest position, the main vent passageway is fluidically separated from the secondary vent passageway by the sealing ridges.

3. The trigger dispensing head of claim 1, wherein the sleeve internally comprises at least one pocket having a predetermined angular extension, axially accessible from outside, and the axially slidable piston comprises at least one abutment so that, in said angular rest position of the sleeve, the abutment prevents the axially slidable piston from axially translating towards the final stroke-end position, and in said angular working position, the abutment is insertable into the at least one pocket to allow the axially slidable piston to translate towards the final stroke-end position.

4. The trigger dispensing head of claim 3, wherein the annular sleeve wall comprises a sleeve edge circumferentially delimiting a head opening for insertion of the axially slidable piston, and wherein the at least one pocket forms a widening on the sleeve edge suitable for insertion of the abutment of the axially slidable piston.

5. The trigger dispensing head of claim 1, wherein the sleeve comprises a maneuvering portion radially protruding outside the annular sleeve wall, said maneuvering portion being graspable by the user to rotate the sleeve.

6. The trigger dispensing head of claim 1, further comprising:

suction valve means adapted to allow passage of a product from the suction duct to the pressure chamber in a suction step and to prevent passage of the product from the pressure chamber to the suction duct in a dispensing step; and pre-compression valve means adapted to allow passage of the product from the pressure chamber to the dispensing duct only when pressure of the product in the pressure chamber exceeds a predetermined threshold value.

7. The trigger dispensing head of claim 6, comprising a valve element comprising a flexible annular membrane cooperating with the sleeve to form said pre-compression valve means.

8. The trigger dispensing head of claim 7, wherein the sleeve comprises an annular end wall cooperating with the flexible annular membrane to form said pre-compression valve means.

9. The trigger dispensing head of claim 8, wherein said valve element comprises a flexible flap cooperating with a suction mouth delimiting the suction duct to form said suction valve means.

10. A trigger dispensing device comprising:

a trigger dispensing head according to claim 1; and a bottle for containing a product to be dispensed;

wherein the trigger dispensing head is applied to the bottle.

* * * * *